(12) United States Patent
Shayani

(10) Patent No.: US 11,294,477 B2
(45) Date of Patent: *Apr. 5, 2022

(54) COMPUTER MOUSE WITH LIGHTWEIGHT HOUSING

(71) Applicant: FINALMOUSE LLC, Venice, CA (US)

(72) Inventor: Ashkon Shayani, New Albany, OH (US)

(73) Assignee: Finalmouse LLC, Venice (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/204,731

(22) Filed: Mar. 17, 2021

(65) Prior Publication Data

US 2021/0200338 A1 Jul. 1, 2021

Related U.S. Application Data

(63) Continuation of application No. 16/216,987, filed on Dec. 11, 2018, now Pat. No. 10,983,609.

(60) Provisional application No. 62/597,910, filed on Dec. 12, 2017.

(51) Int. Cl.
  *G09G 5/08* (2006.01)
  *G06F 3/0354* (2013.01)
  *G06F 3/01* (2006.01)

(52) U.S. Cl.
  CPC .......... *G06F 3/03543* (2013.01); *G06F 3/017* (2013.01); *G06F 2203/0333* (2013.01)

(58) Field of Classification Search
  CPC ................. G06F 3/03543; G06F 3/017; G06F 2203/0333; G06F 3/039

USPC .......................................... 248/118; 345/163
See application file for complete search history.

(56) References Cited

U.S. PATENT DOCUMENTS

| | | |
|---|---|---|
| D884,699 S | 5/2020 | Mohammad |
| D892,116 S | 8/2020 | Jansson et al. |
| D903,670 S | 12/2020 | Wang |
| D903,671 S | 12/2020 | Wang |
| D903,672 S | 12/2020 | Wang |
| D906,331 S | 12/2020 | Mohammad |
| D912,673 S | 3/2021 | Wang |
| D913,285 S | 3/2021 | Wang |
| 10,983,609 B2 | 4/2021 | Shayani |
| D929,403 S | 8/2021 | Liu |
| D931,857 S | 9/2021 | Wang |

(Continued)

OTHER PUBLICATIONS

Tt eSports Ventus X Review—Surprising?, Aug. 16, 2015, https://www.youtube.com/watch?v=y3AMSfcAuEw.*

*Primary Examiner* — Abdul-Samad A Adediran
(74) *Attorney, Agent, or Firm* — Fish & Richardson P.C.

(57) ABSTRACT

A computer mouse includes a lightweight shell housing for improved performance in electronic sports applications. The shell housing includes a plurality of openings that are defined by support members supporting the integrity of the shell, yet reduce the overall weight of the computer mouse. In exemplary embodiments, the support members and openings may be present on either the upper shell surface, the bottom shell surface, side surfaces and/or any combination of the above. In an exemplary embodiment, the openings may be hexagonal forming a honeycomb framework that provides a rigid housing but omits a substantial amount of material from the housing that provides a significant weight reduction.

18 Claims, 11 Drawing Sheets

(56) References Cited

U.S. PATENT DOCUMENTS

| | | | |
|---|---|---|---|
| 2002/0190951 A1* | 12/2002 | Joo | G06F 3/03543 345/163 |
| 2006/0007145 A1* | 1/2006 | Naghi | G06F 3/03543 345/163 |
| 2007/0152110 A1* | 7/2007 | Fong | G06F 3/039 248/118 |
| 2016/0109964 A1 | 4/2016 | Wang | |
| 2019/0179430 A1 | 6/2019 | Shayani | |

* cited by examiner

COMPUTER MOUSE WITH LIGHTWEIGHT HOUSING

CROSS REFERENCE TO RELATED APPLICATIONS

This application is a continuation of and claims priority to U.S. patent application Ser. No. 16/216,987, titled "COMPUTER MOUSE WITH LIGHTWEIGHT HOUSING," filed on Dec. 11, 2018, which claims the benefit under 35 U.S.C. § 119(e) of the filing date of U.S. Provisional Application Ser. No. 62/597,910, filed on Dec. 12, 2017, both of which are incorporated herein by reference in their entirety.

TECHNICAL FIELD

The subject disclosure relates to computer accessories and more particularly, to a computer mouse with lightweight housing.

BACKGROUND

A conventional computer mouse is generally satisfactory for daily use in typical workstations. However, some specific applications require higher performance from a computer mouse that a conventional mouse cannot provide. For example, gaming applications often benefit from having more buttons available on the mouse so that the user does not need to (or at least lessens the need to) activate functions using a keyboard. Thus, it is known hat a need exists to improve computer mouse performance.

For example, in electronic sports, a user's performance may be affected by the reaction time and response time of a mouse click. The difference in victory may often come down to milliseconds difference of one competitor clicking a mouse before an opponent. Mouse factors such as feel of the mouse housing, tracking response, button response, and weight are a concern for professional gamers.

As can be seen, there is a need to improve in one aspect, the weight characteristic of a computer mouse. Embodiments disclosed below solve this problem.

SUMMARY

In one aspect of the disclosure, a computer mouse is disclosed. The computer mouse comprises: a control system for tracking a position of the computer mouse relative to an underlying surface; an output interface connected to the control system; and a shell housing the control system. The shell housing includes a bottom surface. The bottom surface may be integrated with a plurality of support members. The support members are arranged into a first plurality of cells defining empty spaces between the support members of each respective cell, and the empty spaces of the cells define at least 10% of a total surface area of the bottom surface.

In another aspect of the disclosure, a computer mouse is disclosed. The computer mouse comprises: a control system for tracking a position of the computer mouse relative to an underlying surface; an output interface connected to the control system; and a shell housing the control system. The shell housing includes a framework of support members defining openings on at least 25% of the total surface area of the shell housing.

In yet another aspect, a computer mouse is disclosed which comprises a control system for tracking a position of the computer mouse relative to an underlying surface; an output interface connected to the control system; and a shell housing the control system, the shell housing including a framework of honeycomb openings on at least a bottom surface of the shell housing.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. Like or similar components are labeled with identical element numbers for ease of understanding.

In general, embodiments of the subject technology provide an improved lightweight computer mouse. As will be appreciated, aspects of the subject mouse reduce the weight of the mouse. This is particularly beneficial for electronic gaming (E-sports) applications. The improved subject mouse provides sufficient structural integrity yet enhances the performance of an e-athlete by reducing weight. The weight reduction increases the user's speed of mouse movement and minimizes the amount of strain placed on the user's hand. The result is improvement in user response time to events in the digital field of play and in some cases, improved performance over extended gaming sessions.

Figure 1:
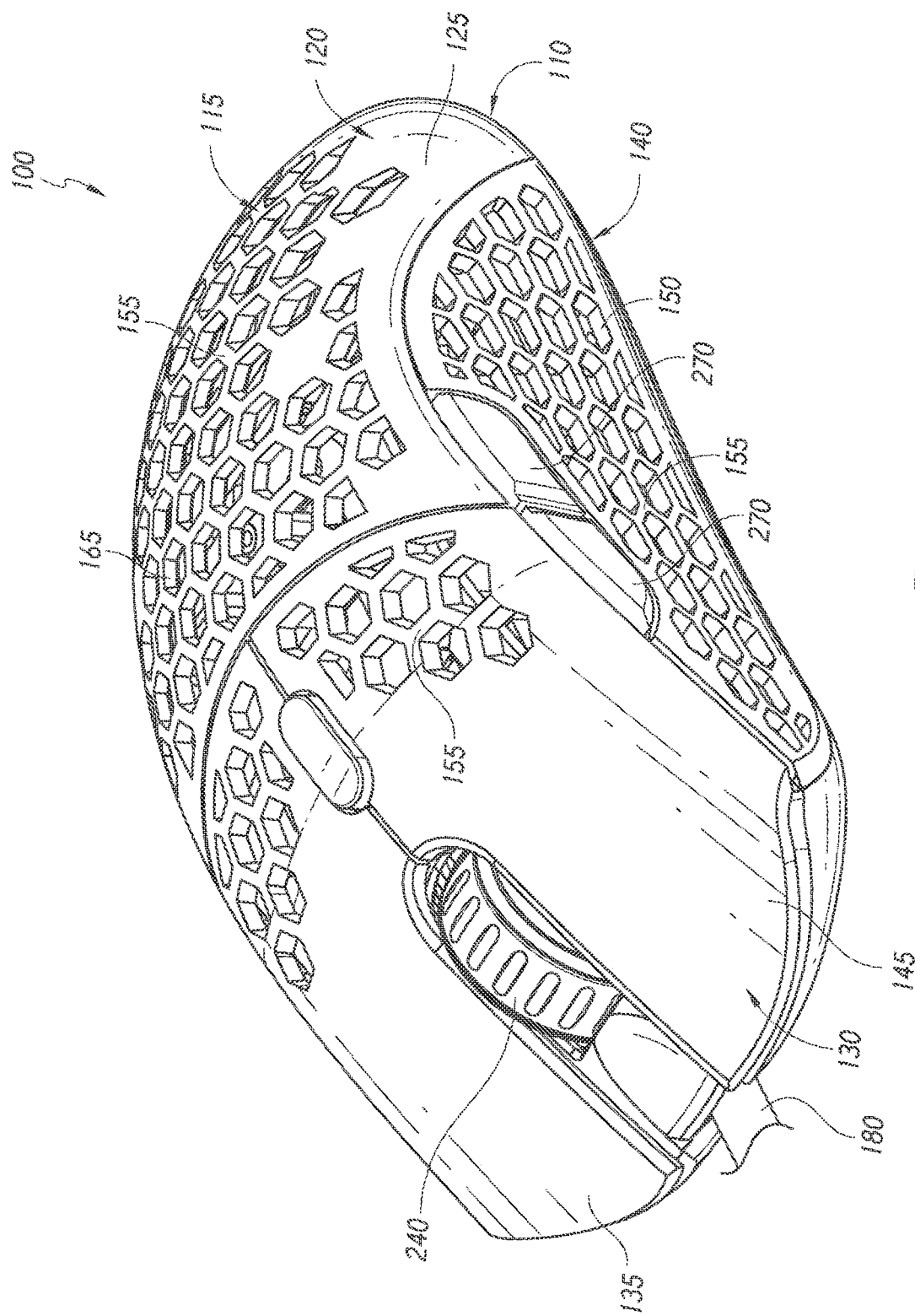
FIG. 1 is a top perspective view of a computer mouse in accordance with an aspect of the subject technology.
Figure 2:
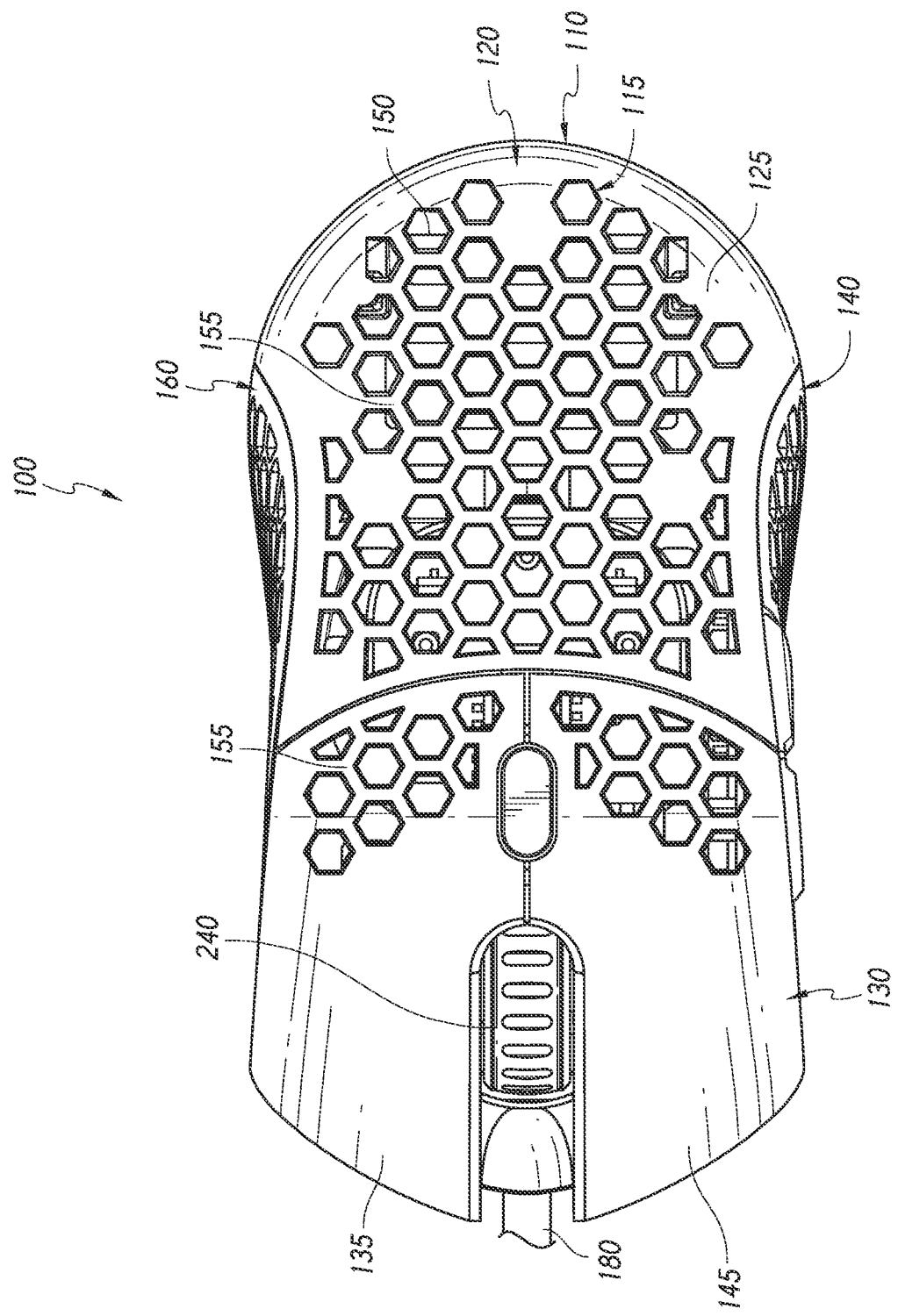
FIG. 2 is a top view of the computer mouse of FIG. 1.
Figure 4:
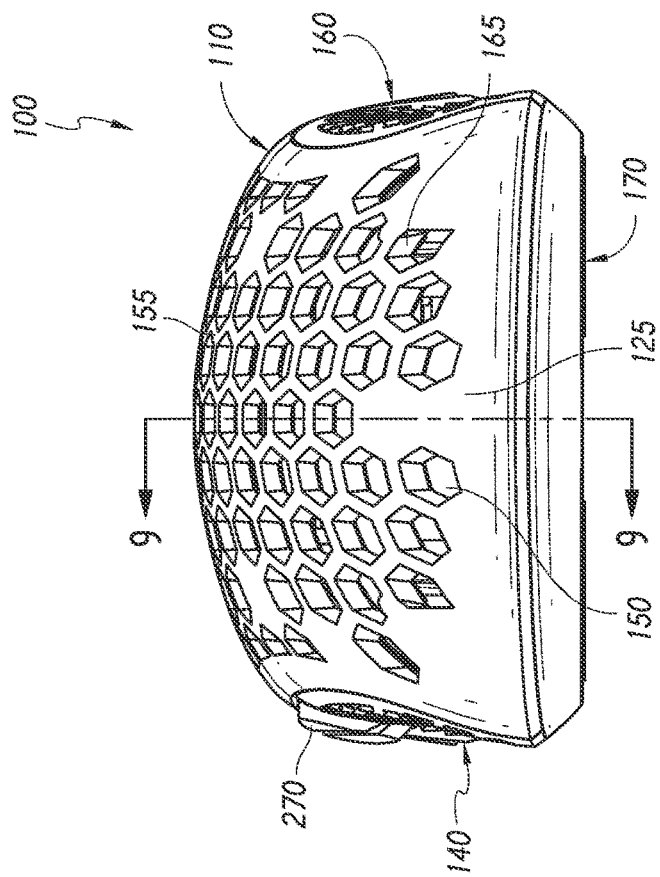
FIG. 4 is a rear view of the computer mouse of FIG. 1.
Figure 3:
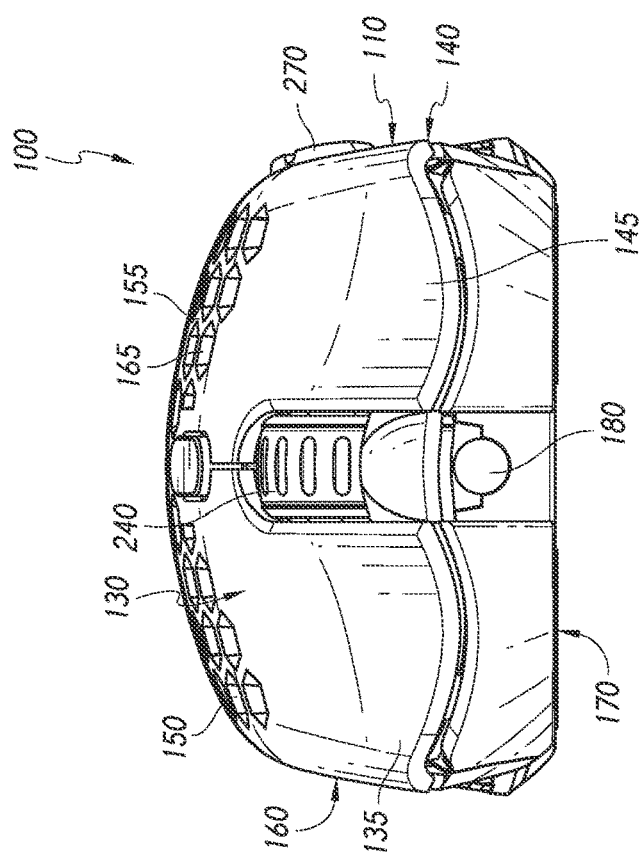
FIG. 3 is a front view of the computer mouse of FIG. 1.
Figure 5:
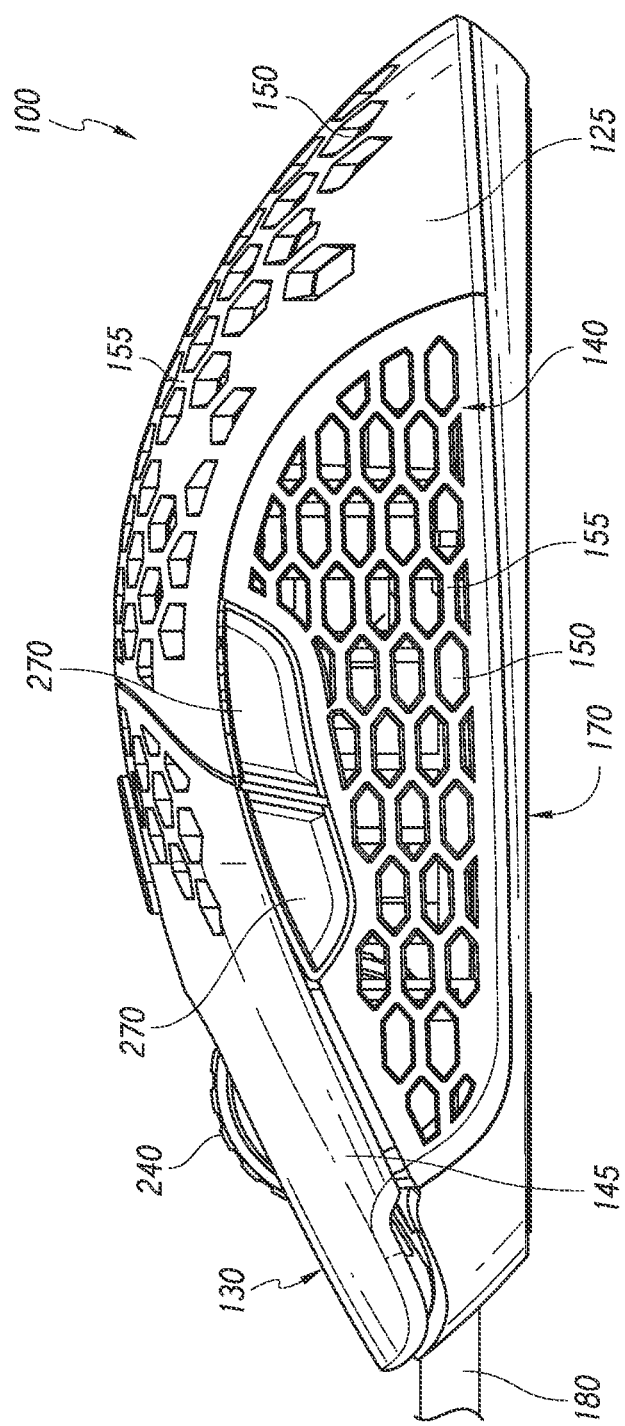
FIG. 5 is a left, side view of the computer mouse of FIG. 1.
Figure 6:
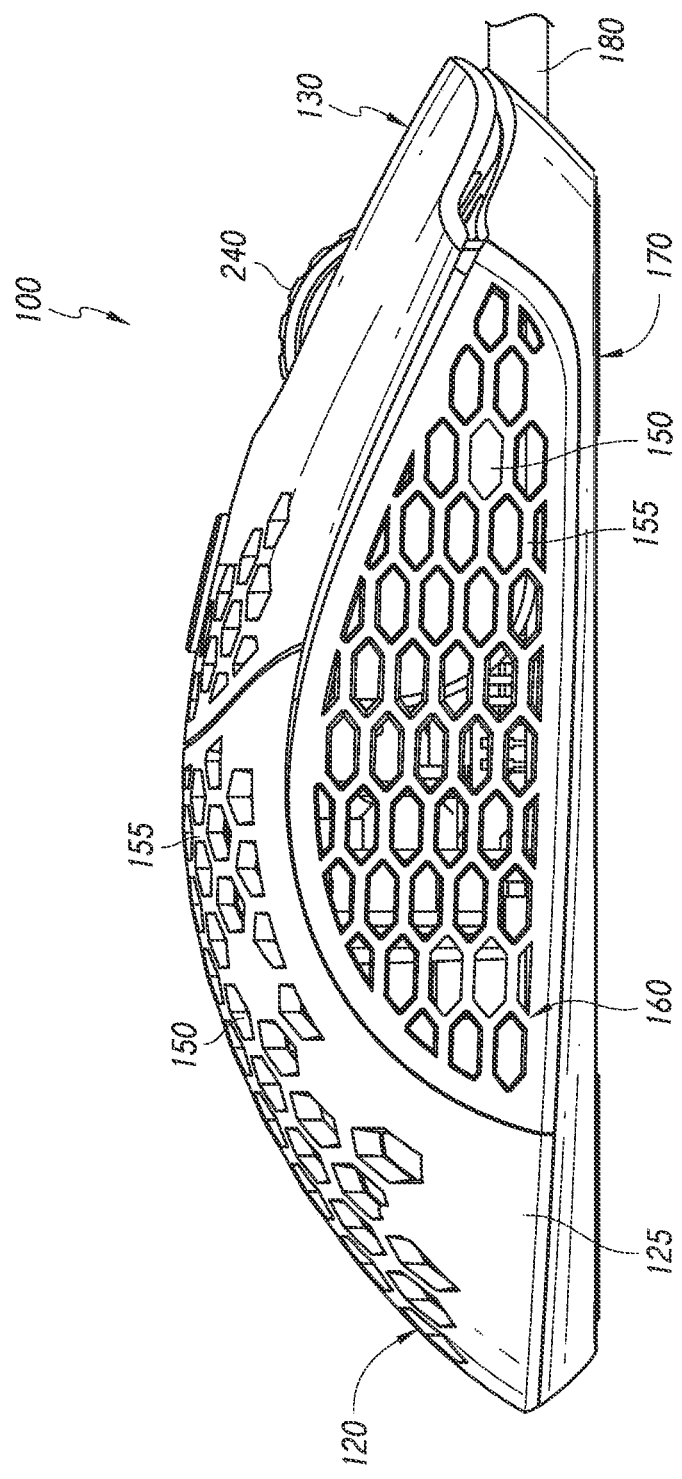
FIG. 6 is a right, side view of the computer mouse of FIG. 1.
Figure 7:
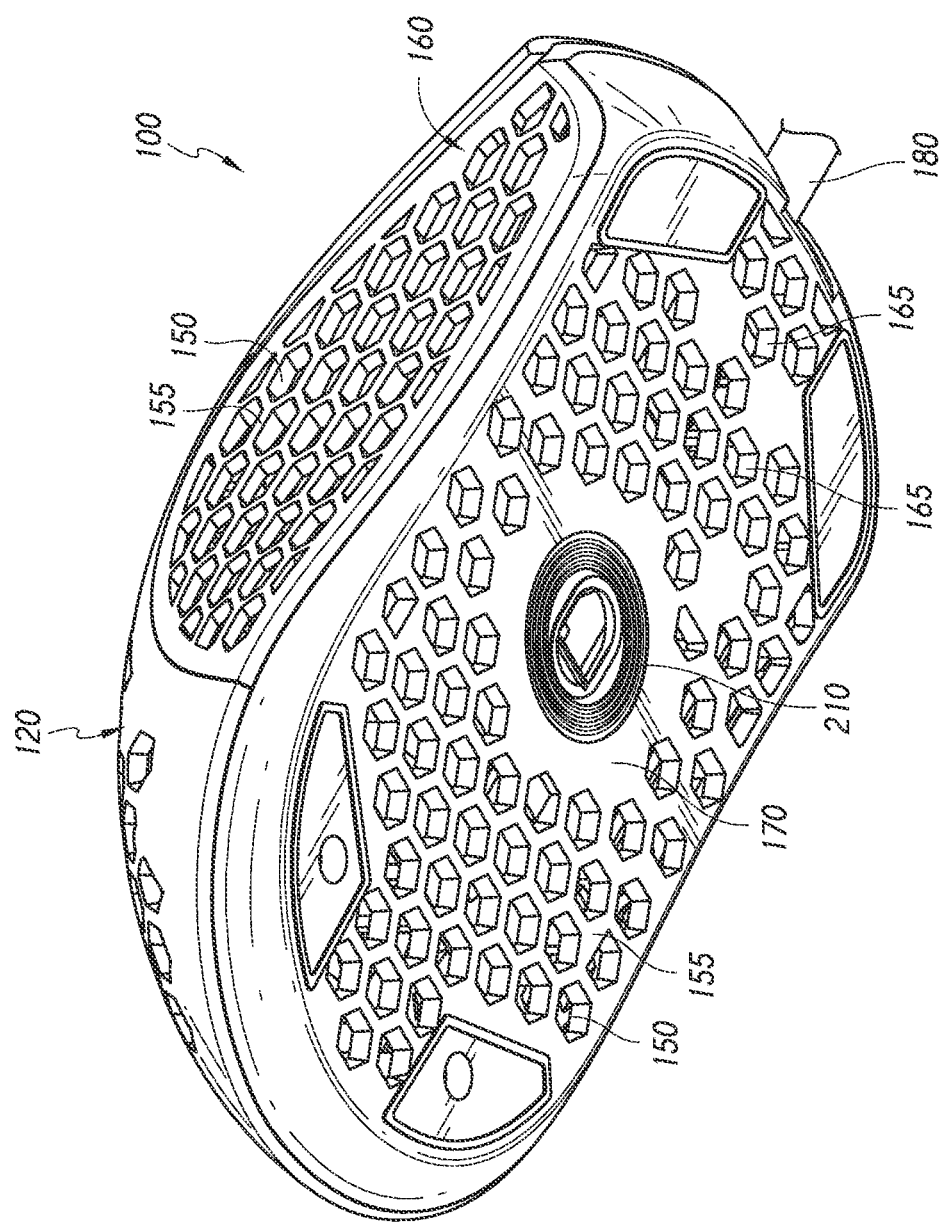
FIG. 7 is a bottom perspective view of the computer mouse of FIG. 1.
Figure 8:
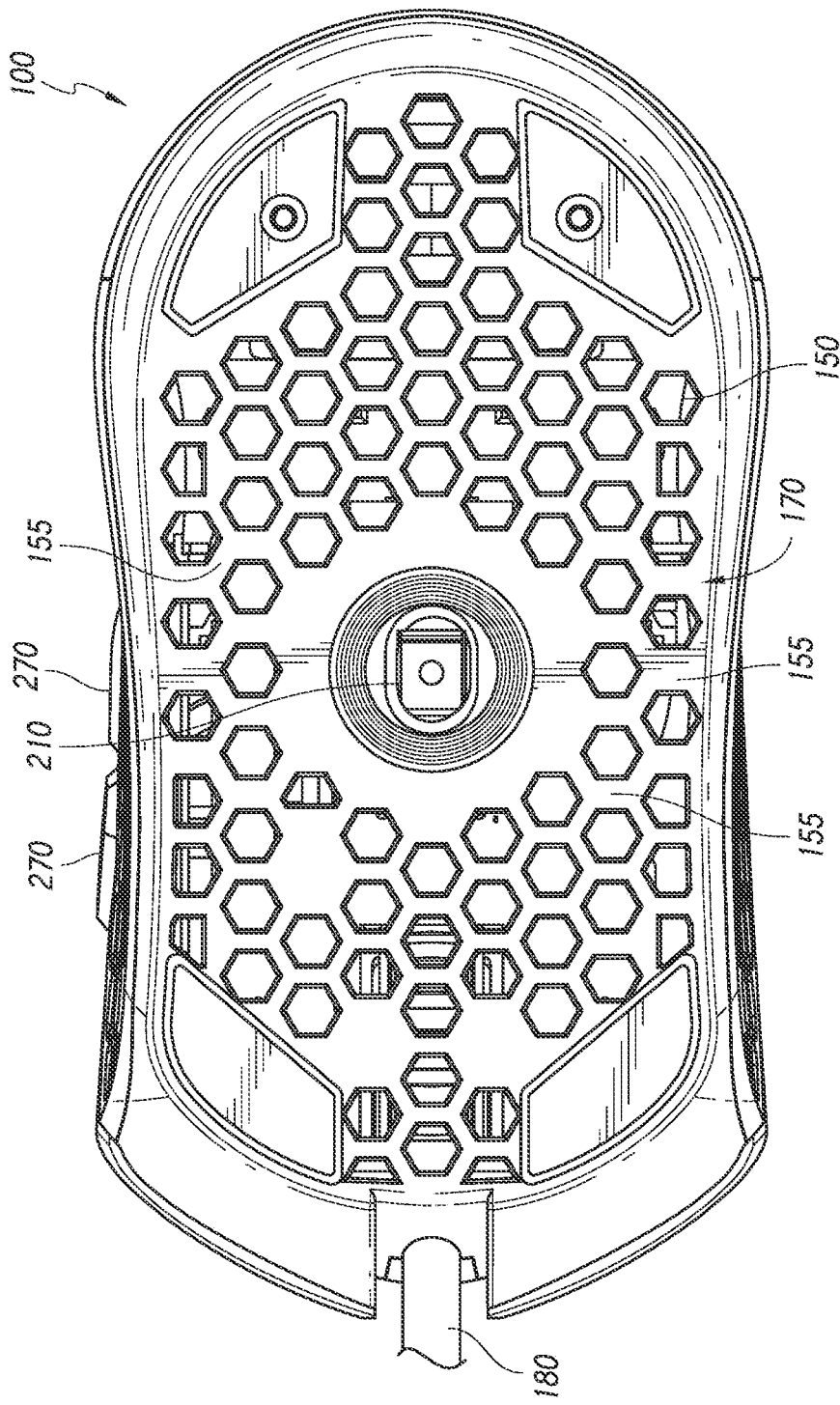
FIG. 8 is a bottom view of the computer mouse of FIG. 1.
Figure 9:
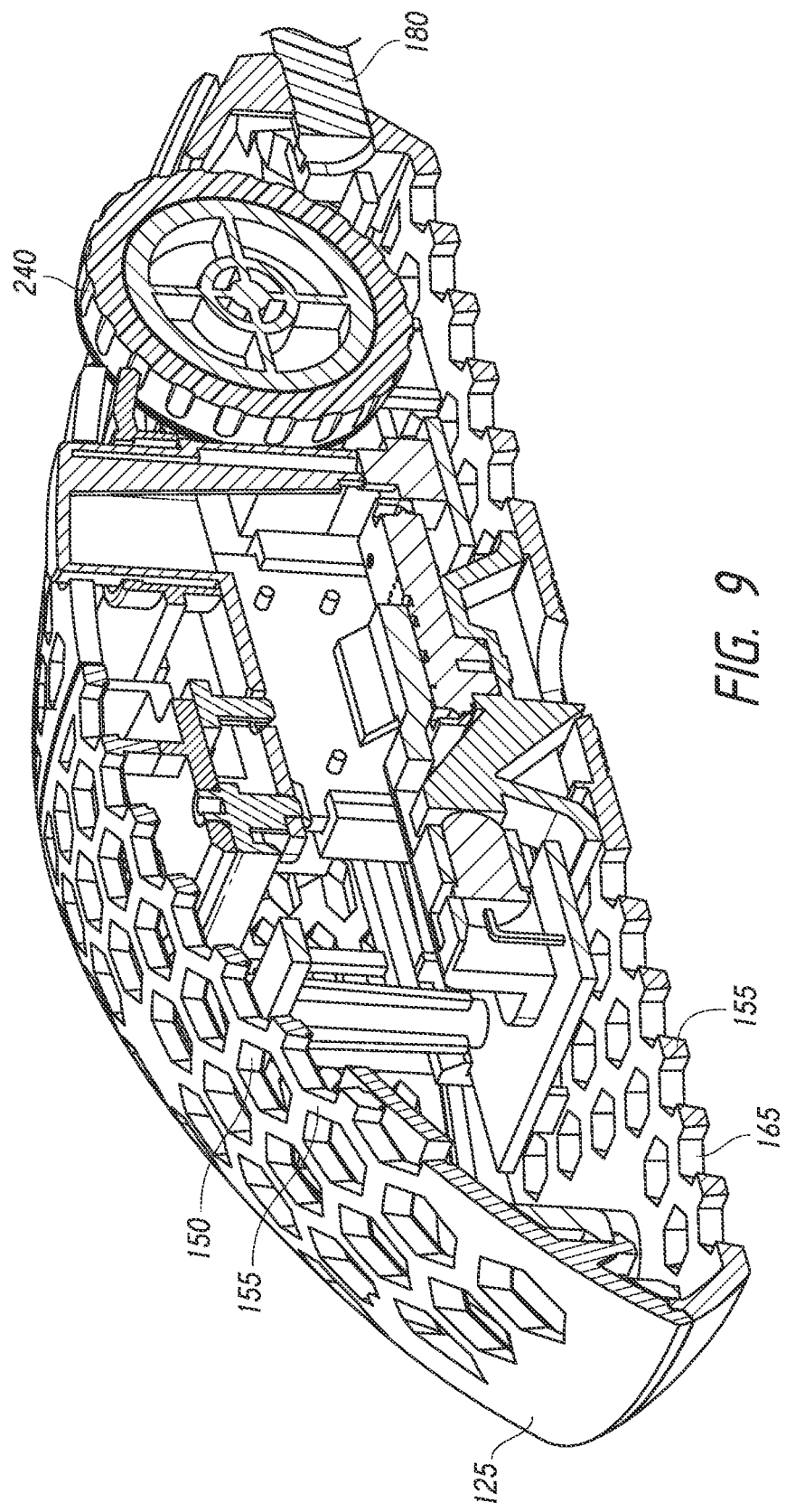
FIG. 9 is a cross-sectional view of the computer mouse taken along the line 9-9 of FIG. 4.
Figure 10:
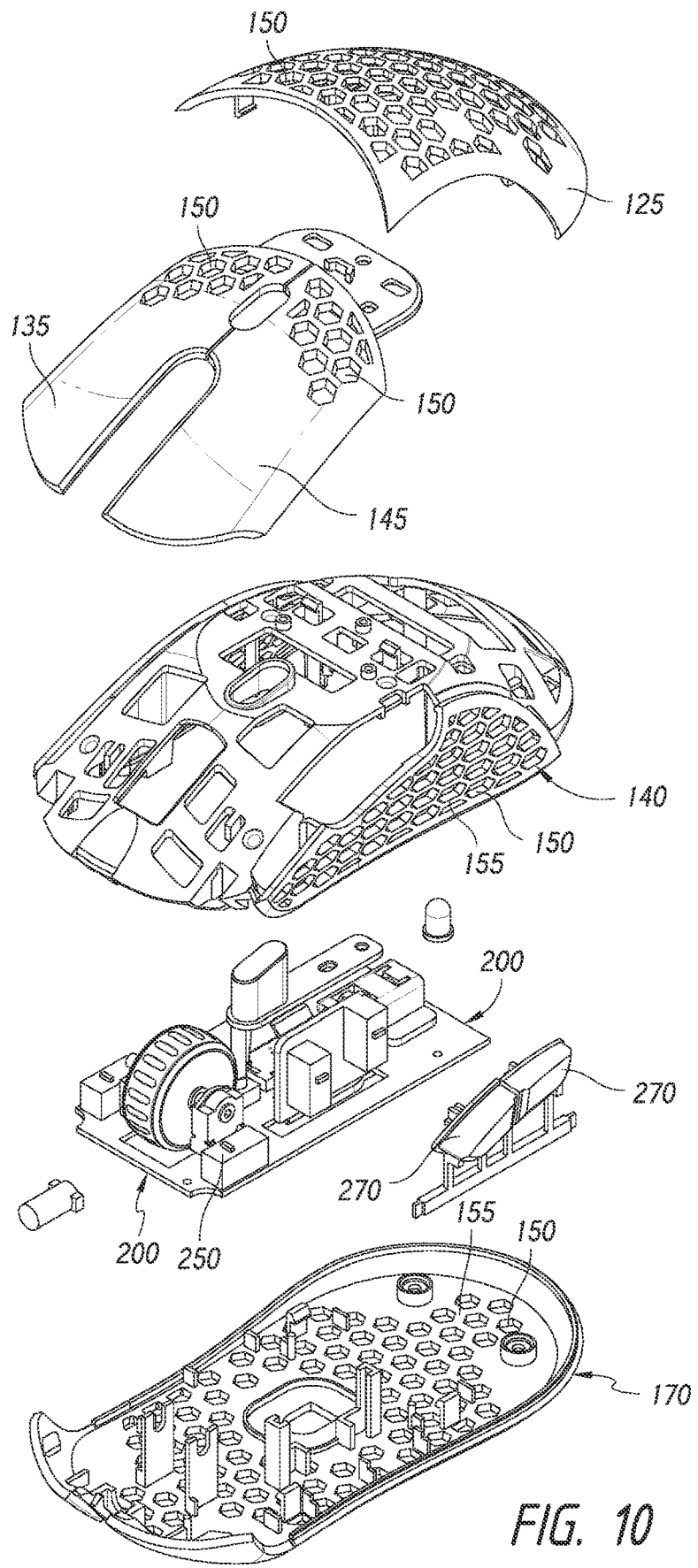
FIG. 10 is an exploded, top perspective view of the computer mouse of FIG. 1.
Figure 11:
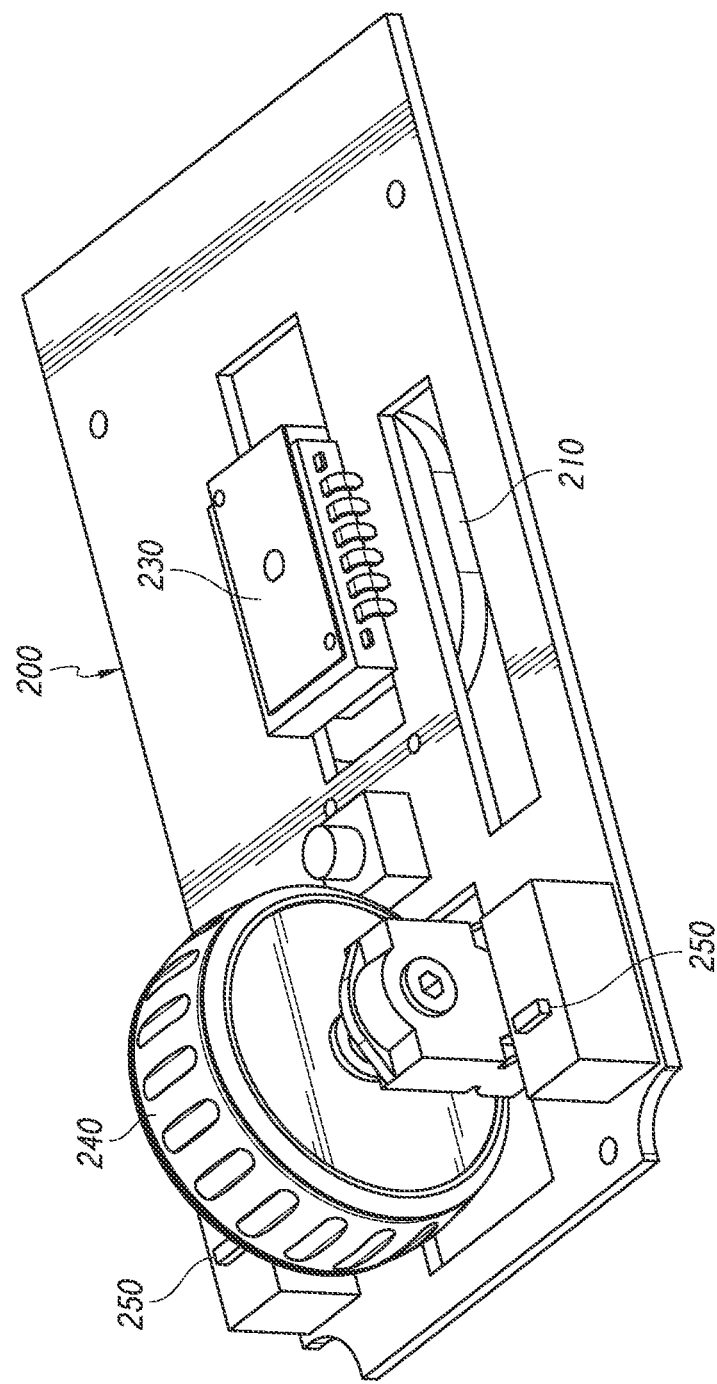
FIG. 11 is an enlarged perspective view of an internal control system of the computer mouse of FIG. 10.
Figure 12:
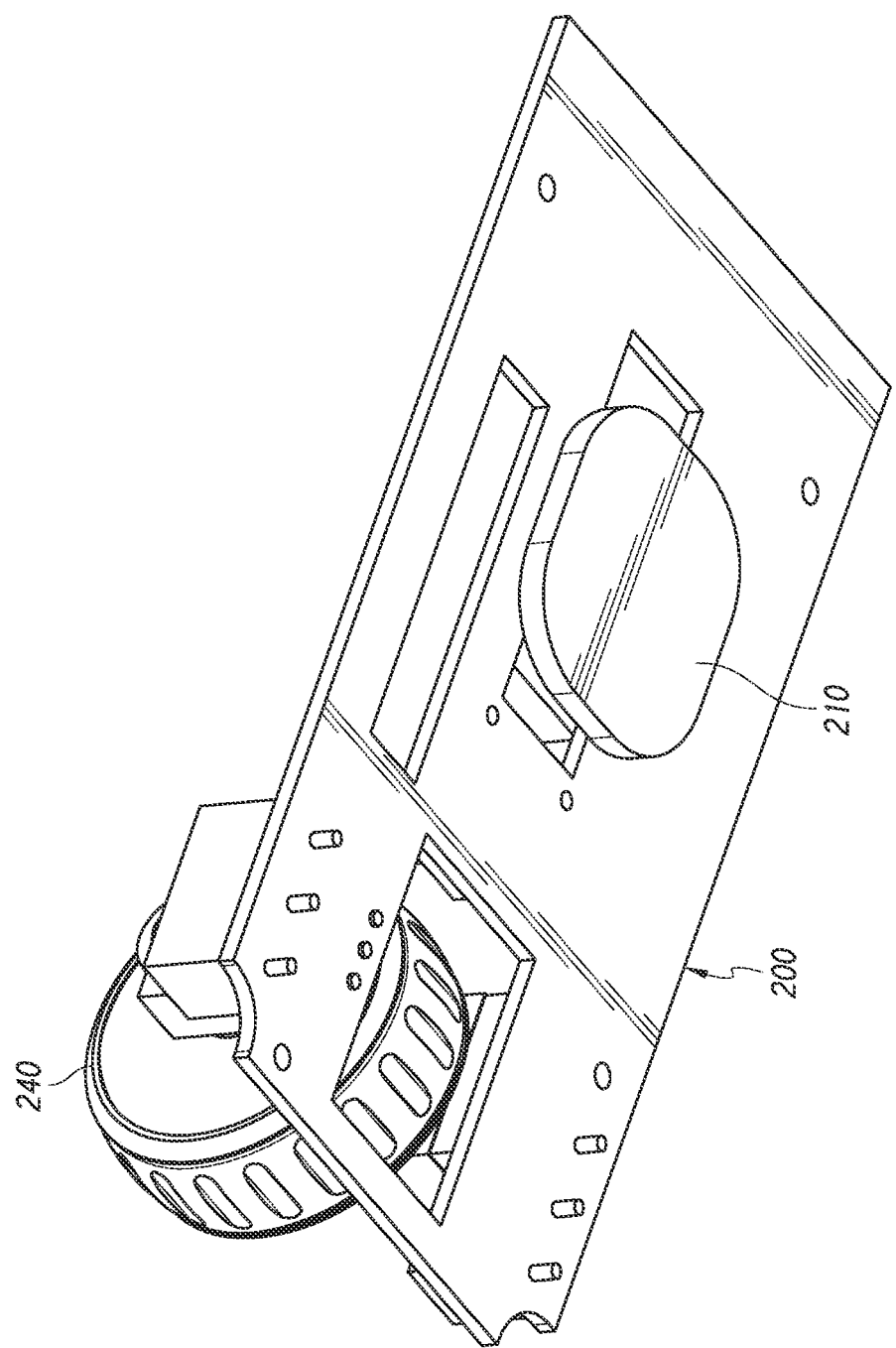
FIG. 12 is bottom perspective view of the control system of FIG. 11.

Referring now to FIGS. 1-12, a computer mouse 100 (sometimes referred to in general as the "mouse 100") is shown according to an exemplary embodiment. The mouse 100 generally includes a shell housing 110 that houses a control system 200 (which mostly hidden from view by the shell housing 110 but visible in FIGS. 10-12). The control system 200 may include a processor 230, a wheel input 240, and one or more button inputs 250. Some embodiments may include side buttons 270 which may be connected to the control system 200. The control system 200 may be connected to an output interface 180 which communicates the position of the mouse 100 and any user input actions (for example, button presses or wheel turns) to a computer (not shown). The embodiment in the Figures shows a wired computer mouse 100 (the output 180 represented by a partial view of a wire) but as will be understood, some embodiments may be a wireless computer mouse. In addition, the computer mouse 110 generally includes a position tracking input system 210 (shown in FIGS. 7, 8, 11, and 12) connected to the control system 200. The position tracking input system 210 may be an optical type system as shown or may be any other type system (for example, a roller ball).

It will be appreciated that aspects of the shell housing 110 provide a lightweight computer mouse 100 that retains structural integrity while providing less strain on a user's hand during use. In an exemplary embodiment, the shell housing 110 includes a framework 115 of openings 150 in one or more surfaces (top, bottom, sides, and in some embodiments, in button sections). The shape of openings 150 may be defined by the arrangement of support members 155. The support members 155 may be rigid and connected to one another. In some embodiments, the support members 155 may connect to form angles defining a polygonal shaped opening 150, which may define the perimeter of an empty space between the support members 155. In an exemplary embodiment, the openings 150 may be a plurality of honeycomb cells. Accordingly, sometimes the openings 150 may be referred to as cells 150 depending on the embodiment. The polygonal cells 150 may include inner walls 165 formed the support members 155. The inner walls 165 may run axially into the shell housing 110. A radius of the openings 150 may be approximately 25 mm. The support members 155 may be approximately 10-20 mm thick.

The shell housing 110 includes a top surface 120 (which may also be referred to as an upper shell surface or upper shell half). In some embodiments, the top surface 120 may be divided into a rear section 125 and a front section 130. The rear section 125 may be configured for resting a user's palm. The openings 150 may comprise between 10% to approximately 90% of the rear section's total surface area. As may be noted, some areas of the rear section 125 may not include an opening 150 which may be due to that part of the top surface 120 being used for an internal support structure (which may be visible for example in the cross-sectional view of FIG. 9). As will be appreciated, arranging the support members 155 to form openings in a substantial area of the top surface 120 creates a substantial reduction in the material used to produce the computer mouse 100, thus reducing a substantial amount of weight moved by the user over time. In some embodiments, the front section 130 may be split in half so that each half (or section if less than a half is used) may be its own button; a left button section 135 and a right button section 145. One or both button sections 135 and 145 may include the openings 150. In an exemplary embodiment, the openings 150 may be positioned toward a rear of each button section (135;145) leaving the front of each button solid providing a familiar tactile feel for the user and sufficient material to trigger an underlying button (see FIG. 10). Yet the position of the openings 150 still further reduce the weight profile of the computer mouse 100 by forming the openings 150 in areas of the button sections 135;145 that do not need material.

The shell housing 110 may also include a bottom surface (or lower shell) 170 (see FIGS. 7-10). The bottom surface 170 may include an aperture to expose the position tracking input system 210 to an underlying surface as is known in the art. The bottom surface 170 may include the openings 150. In an exemplary embodiment, the support members 155 define openings 150 which may comprise between 10%-approximately 80% of to surface area of the bottom surface 170. The openings 150 may in some embodiments be positioned on at least two sides of the position tracking input system 210. In one embodiment, the openings 150 are positioned surrounding the position tracking input system 210. As will be appreciated, the footprint of solid housing material remaining after the inclusion of the support members 155 and openings 150 is minimal resulting in substantial weight reduction. Yet being a substantially planar surface, the bottom surface 170 remains unhampered in its integrity as most of the pressure applied by a user is shouldered by the solid perimeter edge of the bottom surface 170. As will be appreciated, a computer mouse 100 with openings 150 in the bottom surface substantially reduces the overall weight of the mouse in a section where one would not normally be motivated to include openings for anything other than a position tracking input device. The bottom surface of a computer mouse in general is designed to move in close proximity over an underlying surface and no other element is generally incorporated into the bottom other than an element tracking the underlying surface and thin casters for helping the bottom surface move along the underlying surface.

In some embodiments, the shell housing 110 may include the support members 155 and openings 150 on a left side wall 140, a right side wall 160 or both. In some embodiments, one or both side walls 140; 160 may include a side trigger button(s) 270. The computer mouse 100 is shown for right-handed use with the trigger buttons 270 on the left side wall 140, however it will be understood that the buttons 270 may be positioned on the right side wall 160. In some embodiment, the openings 150 may be positioned over and up to the entirety of a side wall (140; 160) surface area (except for where other elements may be present such as the trigger buttons 270).

It will be appreciated that the support members 155 for the framework 115 in such a manner that most of the normally solid areas of a computer mouse are replaced with geometric bridges between openings that provide a substantial reduction in weight yet provides a rigid feel for the user which may want to retain the familiar overall shape and feel of a mouse. Embodiments using hexagonally arranged support members 155 (which may include a depth element in a honeycomb shape) provide a substantially reliable support structure. The support members 155 and openings 150 may cover a substantial portion of the total shell housing 110 which may be for example, at least 25% of the total surface area and up to approximately 70% percent of the total surface area. The aggregate weight reduction provided by the support members 155 defining openings 150 significantly reduces the weight so much that a professional gamer will immediately feel the difference when operating the mouse 100.

Those of skill in the art would appreciate that various components and blocks may be arranged differently (e.g., arranged in a different order, or partitioned in a different way) all without departing from the scope of the subject technology. For example, while the support members 155 are generally shown to form hexagons, other embodiments may modify the support member 155 connections to form other polygons such as triangles, squares, pentagons, or any number sided polygon higher or lower than a hexagon and any combination of shapes may be used. Some embodiments may use round or oval openings 150 providing similar weight reduction with a sufficient number of openings 150 integrated into the shell housing 110 or any of its surfaces. It will be understood that each shape formed by the support members 155 may have an advantage over another shape, and the choice of shape types included in the shell housing 110 may be a matter of design choice.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

The word "exemplary" is used herein to mean "serving as an example or illustration." Any aspect or design described herein as "exemplary" is not necessarily to be construed as preferred or advantageous over other aspects or designs.

The invention claimed is:

1. A computer mouse comprising:
   a shell comprising a top surface, a bottom surface, and side surfaces; and
   a control system housed in the shell, the control system configured to track a position of the computer mouse relative to a surface and communicate the position of the computer mouse to a computer,
   wherein a plurality of support members on the bottom surface of the shell are connected to one another to define perimeters of a plurality of polygonal cells on the bottom surface, wherein the perimeters of the plurality of polygonal cells define empty spaces between the plurality of support members, wherein the plurality of polygonal cells comprise a first cell having a first polygonal shape and a second cell having a second polygonal shape distinct from the first polygonal shape.

2. The computer mouse of claim 1, wherein the plurality of polygonal cells comprise a hexagonal cell.

3. The computer mouse of claim 1, wherein the plurality of support members comprise a set of support members arranged on a front portion of the bottom surface of the shell and connected to one another to define perimeters of a set of polygonal cells of the plurality of polygonal cells on the front portion of the bottom surface.

4. The computer mouse of claim 3, wherein:
   the set of support members corresponds to a first set of support members, and the set of polygonal cells corresponds to a first set of polygonal cells, and
   the plurality of support members comprise a second set of support members arranged on a rear portion of the bottom surface of the shell and connected to one another to define perimeters of a second set of polygonal cells of the plurality of polygonal cells on the rear portion of the bottom surface.

5. The computer mouse of claim 3, further comprising a position tracking input system exposed through an aperture on the bottom surface of the shell, the position tracking input system connected to the control system, wherein the set of support members and the set of polygonal cells are positioned forward of the aperture.

6. The computer mouse of claim 1, wherein the bottom surface of the shell comprises a planar surface, at least one of the plurality of polygonal cells is positioned along a front edge of a perimeter of the planar surface, and at least one of the plurality of polygonal cells is positioned along a rear edge of the perimeter of the planar surface.

7. The computer mouse of claim 1, wherein the empty spaces of the plurality of polygonal cells define at least 10% of a total surface area of the bottom surface.

8. The computer mouse of claim 1, further comprising a position tracking input system exposed through an aperture on the bottom surface of the shell, the position tracking input system connected to the control system, wherein the empty spaces surround the aperture.

9. The computer mouse of claim 1, wherein the bottom surface comprises:
   a first area in a front-right sector of the bottom surface that does not contain the empty spaces, and
   a second area in a front-left sector of the bottom surface that does not contain the empty spaces.

10. The computer mouse of claim 9, wherein the bottom surface comprises:
    a third area proximate a rear-right sector of the bottom surface that does not contain the empty spaces, and
    a fourth area proximate a rear-left sector of the bottom surface that does not contain the empty spaces.

11. The computer mouse of claim 1, wherein:
    the plurality of support members correspond to a first plurality of support members, and the plurality of polygonal cells correspond to a first plurality of polygonal cells, and
    the computer mouse further comprises:
       one or more button sections on the top surface of the shell, the one or more button sections comprising a second plurality of support members connected to one another to define perimeters of a second plurality of polygonal cells on the one or more button sections, wherein the perimeters of the second plurality of polygonal cells define empty spaces between the second plurality of support members.

12. The computer mouse of claim 11, wherein a first set of the empty spaces between the second plurality of support members is on a left portion of the one or more button sections, and a second set of the empty spaces between the second plurality of support members is on a right portion of the one or more button sections.

13. The computer mouse of claim 11, wherein the empty spaces between the second plurality of support members are on a rear portion of the one or more button sections.

14. The computer mouse of claim 1, wherein:
    the plurality of support members correspond to a first plurality of support members, and the plurality of polygonal cells correspond to a first plurality of polygonal cells, and
    a second plurality of support members on the top surface of the shell are connected to one another to define perimeters of a second plurality of polygonal cells on the top surface of the shell, wherein the perimeters of the second plurality of polygonal cells define empty spaces between the second plurality of support members.

15. A computer mouse comprising:
    an upper shell;
    a lower shell defining a plurality of polygonal openings extending through the lower shell, wherein the plurality of polygonal openings comprise a first opening having a first polygonal shape and a second opening having a second polygonal shape distinct from the first polygonal shape;

a left side wall extending between the upper shell and the lower shell;

a right side wall extending between the upper shell and the lower shell; and a control system supported on the lower shell, the control system configured to track a position of the computer mouse relative to a surface and communicate the position of the computer mouse to a computer.

16. The computer mouse of claim 15, wherein the lower shell comprises inner walls defining the plurality of polygonal openings.

17. The computer mouse of claim 15, wherein the plurality of polygonal openings comprise a hexagonal opening.

18. The computer mouse of claim 15, further comprising a position tracking input system exposed through an aperture defined by the lower shell, wherein the plurality of polygonal openings comprises a first set of polygonal openings positioned forward of the aperture, and a second set of polygonal openings positioned rearward of the aperture.

* * * * *